United States Patent [19]
Fortmann

[11] 3,770,918
[45] Nov. 6, 1973

[54] MONITORING DEVICE FOR REVERSIBLE BLOW-OUT DISC

[75] Inventor: Manfred Fortmann, Bensberg, Germany

[73] Assignee: Interatom, Internationale Atomreaktorbau GmbH, Bensberg/Cologne, Germany

[22] Filed: Nov. 5, 1971

[21] Appl. No.: 195,925

[30] Foreign Application Priority Data
Nov. 14, 1970 Germany.................. P 20 56 167.5

[52] U.S. Cl.............. 200/61.08, 137/68, 200/83 R, 340/242
[51] Int. Cl....................... H01h 35/24, F16k 17/40
[58] Field of Search...................... 200/61.08, 61.05, 200/81 R, 83 N, 83 R, 83 B, 83 P, 81.6; 340/242; 73/102; 137/67, 68

[56] References Cited
UNITED STATES PATENTS

| | | | |
|---|---|---|---|
| 2,721,240 | 10/1955 | Filbert, Jr. | 200/83 R |
| 2,067,440 | 1/1937 | Finney | 200/61.05 X |
| 3,049,601 | 8/1962 | Hardesty | 200/61.08 X |
| 2,525,743 | 10/1950 | White | 200/83 R |
| 2,230,961 | 2/1941 | Lewis | 340/242 |
| 2,381,582 | 8/1945 | Erickson | 200/83 B |

Primary Examiner—Robert K. Schaefer
Assistant Examiner—Robert A. Vanderhye
Attorney—Arthur E. Wilfond et al.

[57] ABSTRACT

A monitoring device for a reversible blow-out disc protects an installation against overpressure. The mointoring device comprises electric probes in the space behind the rupture disc. The probes distinguish between various possible types of malfunction in the installation.

5 Claims, 3 Drawing Figures

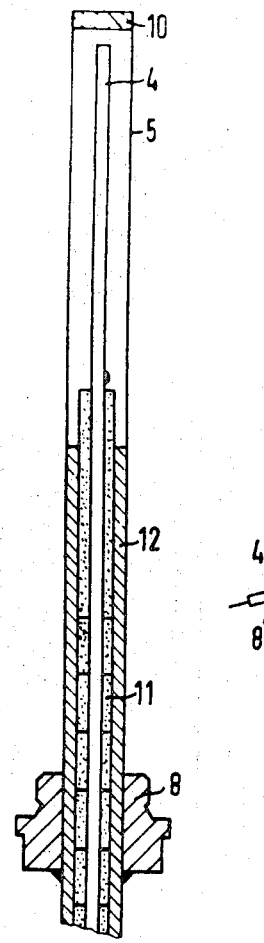
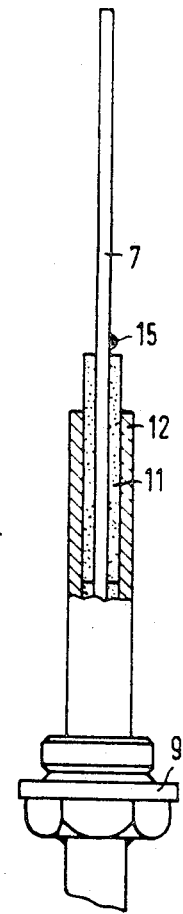
Fig. 1
Fig. 2
Fig. 3
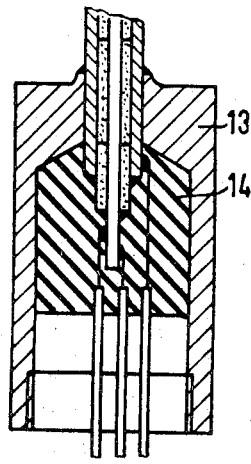
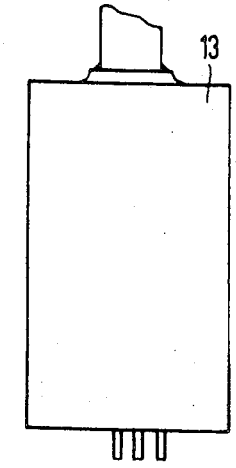

MONITORING DEVICE FOR REVERSIBLE BLOW-OUT DISC

The invention relates to a monitoring device for a reversible blow-out disc for protecting an installation against overpressure. The installation may comprise a tank, pipeline, or the like, and may conduct liquids or gases of electrically conductive or electrically non-conductive type.

Reversible blow-out discs for the protection of tanks against overpressure are utilized particularly for active media and are described in German Pat. No. 964,823. However, there is no provision for monitoring the functioning of these blow-out discs nor is there a provision for securing the installation in the event of failure of the blow-out discs.

An object of the invention is to provide a monitoring arrangement for reversible blow-out discs for protecting installations against overpressure. Another object is to provide a monitoring device for reversible blow-out discs, preferably of the type disclosed in copending U.S. patent application Ser. No. 39,781.

A further object of the invention is to provide a monitoring device for reversible blow-out discs for protecting installations against overpressure, which monitoring device permits a distinction between several possible types of malfunction and, if necessary, actuates suitable countermeasures. The various types of malfunction which may occur, and which are distinguished by the monitoring device, are, first, a blow-out of the rupture disc, as intended, to release a safety discharge, second, a flip-over or reversing of the blow-out disc, but not a rupture thereof, third, non-response of the blow-out disc, despite the reaching of a set critical pressure, and fourth, the escape of the medium being monitored through a leak in the blow-out disc or its mounting. The detection of the escape of the medium being monitored through a leak in the blow-out disc or its mounting may be achieved only if the medium is an electrically conductive liquid such as, for example, liquid sodium in a nuclear power plant.

Another object of the invention is to provide a monitoring device for a reversible blow-out disc for protecting an installation against overpressure with efficiency, effectiveness and reliability.

In accordance with the invention, a monitoring device for a reversible blow-out disc for protecting an installation against overpressure comprises a support in the installation. A reversible blow-out disc is mounted on the support in the installation. One or a plurality of electrically insulated feedthroughs are provided in the support extending from outside to inside the installation. One or a plurality of electric probes are mounted in the feedthroughs and extend into the space behind the blow-out disc. The installation comprises a tank, pipeline, or the like. The electric probes transmit an electrical signal as soon as they are short-circuited to the installation.

The blow-out disc moves through a predetermined region in the space behind it when it flips over under pressure in the installation. In another embodiment of the invention, at least one electric probe extends into such region, so that the probe is short-circuited to the installation by contact with the blow-out disc in its flipped over condition and transmits an electrical signal. Failure of the blow-out disc to respond, despite the intended critical pressure being reached, as ascertained by other means in a manner not disclosed herein, may then be recognized by the failure of an electrical signal to be transmitted.

In another embodiment of the invention, in which electrically conductive liquid is contained in the installation in front of the blow-out disc and the blow-out disc moves through a predetermined region in the space behind it when it flips over under pressure of the liquid in the installation, at least one electric probe extends into the space behind such region. The probe, which is mounted in an electrically insulated feedthrough, responds to immersion in the medium being monitored. This is irrespective of whether or not the medium being monitored has entered into the space being monitored through a leak in the blow-out disc or in the support of the blow-out disc, or due to the blow-out of the rupture disc, which has opened the safety discharge.

In still another embodiment of the invention, the probe has a housing in electrical contact with the installation and a closed readily deformed electrically conductive protective tube conductively connected to the housing. The closed protective tube comprises, for example, metal. When the blow-out disc flips over or bulges, the protective tube of the probe is pushed in by the blow-out disc until electrical contact is established between the probe and the installation. This assures that the probe responds only to the flipping over of the blow-out disc, and not to a medium which has accidentally entered the monitored space due to a leak in the blow-out disc or in its support, for example. In a corrosive or dirty environment, an impairment of the ability of the probe to make electrical contact is prevented if the probe of the aforedescribed embodiment is utilized.

In a further embodiment of the invention, the electric probe has a closed protective tube of brittle insulating material. The protective tube comprises, for example, glass or ceramic material, which breaks upon impact with the flipped over or bulging blow-out disc, thereby permitting electrical contact between the blow-out disc and the probe.

If the probes, possibly in conjunction with an indicator located elsewhere for indicating and reacting at the preset critical pressure, are suitably connected, which connection or indicator are not disclosed herein in detail, electrical signals may be produced which provide unequivocal information regarding the condition of the blow-out disc and/or a penetration of the medium being monitored into the space behind the blow-out disc. These electrical signals may be utilized, if desired, to trigger other devices in accordance with the situation. Such devices may be utilized to assure the safety of the installation such as, for example, rapid disconnection of pumps, when the installation is a tank of pipeline.

In order to distinguish the four aforedescribed situations, the probes may be provided in either or both of two variants and may be arranged in either or both of two different positions in the support unit or ring of the blow-out disc. The variants and positions may be provided singly, or in any combination, in accordance with the desired monitoring function to be provided.

The first variant provides an open probe which is bare, that is, which constitutes a non-enclosed wire.

The second variant provides an enclosed probe, that is, a probe enclosed in a protective tube.

The first position provides the extending of the tip of the probe into the flip-over or bulging region of the blow-out disc.

The second position provides the positioning of the tip of the probe in a region other than the flip-over or bulging region.

In the foredescribed first example, in which the blow-out disc has ruptured, all the probes in the first and second variants and first and second positions respond.

In the aforedescribed second example, in which the blow-out disc has flipped over, but has not ruptured, all the probes in the first position respond, whereas the probes in the second position do not respond.

In the aforedescribed third example, in which the blow-out disc has reached the set critical pressure but has not responded, none of the probes respond, but the critical pressure is reached.

In the aforedescribed fourth example, in which the medium being monitored escapes through a leak in the blow-out disc or its mounting, only probes in the first variant respond, one after the other, in ccordance with the geometric conditions.

In order that the invention may be readily carried into effect, it will now be described with reference to the accompanying drawings, wherein:

FIG. 1 is a schematic diagram, partly in section, of an embodiment of the monitoring device of the invention;

FIG. 2 is a view, partly in section, of an embodiment of an enclosed probe of the monitoring device of the invention; and FIG. 3 is a view, partly in section, of an embodiment of an open probe of the monitoring device of the invention.

In the figures, the same components are identified by the same reference numerals.

In FIG. 1, a reversible blow-out disc 1 is tightly mounted in a support device or ring 2. The support ring 2 is tightly mounted in an installation 3 which comprises a tank or a pipeline to be monitored. A probe 4, which is protected by a closed protective tube 5, extends into the flip-over or bulging region 6 behind the blow-out disc 1.

The blow-out disc 1 is indicated in FIG. 1 in its inoperative position by a solid line and is indicated in its flip-over or bulging position by a broken line. The flip-over or bulging region 6 of the blow-out disc 1, behind said blow-out disc, is thus bonded by the solid and broken lines representing said disc in its two positions.

An open probe 7 extends into a region behind the blow-out disc 1 which is different from the flip-over region 6. A pair of feedthroughs 8 and 9, each comprising electrically insulating material, are threaded into corresponding apertures, holes, or conduits formed through the support ring 2. The probe 4 is mounted in the feedthrough 8 and the probe 7 is mounted in the feedthrough 9, so that said probes are electrically insulated from the support ring.

In the embodiment of FIG. 2, the probe 4 is elongated and is electrically conductive. The probe 4 is enclosed by the protective tube 5 which is closed at its upper end by a cover 10. The probe 4 is electrically insulated by electrically insulating material 11 which may comprise, for example, individual ceramic beads. The insulating material 11 insulates the probe 4 from the protective tube 5 and from an enclosing tube 12, thereby insulating said probe from the feedthrough 8.

A contact housing 13 is affixed to the lower end of the enclosing tube 12 in any suitable manner such as, for example, by welding. The electrical connections for the probe 4 and for the enclosing tube 12 are provided in the housing 13 and are embedded in an insulating compound. The contact housing 13 is terminated by a standard threaded connection, not shown in the figure. The protective tube 5 is conductively connected to the enclosing tube 12 and is welded in a gas-tight manner, so that the device is suitable in areas where there is an explosion hazard.

In the embodiment of FIG. 3, the probe 7 is open, that is, it is not enclosed in or surrounded by a protective tube. A welded spot 15 is provided on the probe 7 in order to hold the electrically insulating material 11 in position on said probe.

While the invention has been described by means of specific examples and in specific embodiments, I do not wish to be limited thereto, for obvious modifications will occur to those skilled in the art without departing from the spirit and scope of the invention.

I claim:

1. A monitoring device for reversible blow-out disc for protecting an installation against overpressure, said monitoring device comprising support means in the installation, the reversible blow-out disc being mounted on the support means in the installation; at least one electrically insulated feedthrough in the support means extending from outside to inside the installation; and at least one electric probe mounted in the feedthrough and extending into the space behind the rupture disc, said at least one electric probe having a protective tube of brittle insulating material.

2. A monitoring device for a reversible blow-out disc for protecting an installation against overpressure in the fluid contained therein, said monitoring device comprising support means in the installation, said disc being mounted on said support means in the installation, said disc being capable of being moved intact through a predetermined region in being flipped over from a first position to a second position when subjected to excessive pressure of said fluid, said disc in said first position having a convex side facing said fluid and in said second position having a concave side facing said fluid, said disc also being capable of being ruptured or detached from its support means in the process of being flipped over from its first position, a first electrically insulated feedthrough in the support means extending from outside to inside the installation, a first electric probe mounted in the feedthrough and extending into the space behind said disc and into said predetermined region, a second electrically insulated feedthrough in the support means extending from outside to inside said installation, and a second electric probe mounted in said second feedthrough and extending into the space behind said disc and beyond said predetermined region.

3. A monitoring device as set forth in claim 2, wherein said electric probe comprises means defining a closed electrically conductive protective tube, said tube being of deformable construction so that said tube is deformed when said disc is moved in being flipped over from said first position.

4. A monitoring device as set forth in claim 2, wherein electrically conductive fluid is contained in the installation.

5. A monitoring device as set forth in claim 2, wherein said second electric probe is a non-insulated conductor.

* * * * *